United States Patent
Shah et al.

(10) Patent No.: US 11,601,715 B2
(45) Date of Patent: Mar. 7, 2023

(54) SYSTEM AND METHOD FOR DYNAMICALLY ADJUSTING CONTENT PLAYBACK BASED ON VIEWER EMOTIONS

(71) Applicant: DISH TECHNOLOGIES L.L.C., Englewood, CO (US)

(72) Inventors: Rima Shah, Thornton, CO (US); Christopher Day, Denver, CO (US); Ryan Blake, Denver, CO (US)

(73) Assignee: DISH Technologies L.L.C., Englewood, CA (US)

( * ) Notice: Subject to any disclaimer, the term of this patent is extended or adjusted under 35 U.S.C. 154(b) by 0 days.

(21) Appl. No.: 15/643,347

(22) Filed: Jul. 6, 2017

(65) Prior Publication Data
US 2019/0014378 A1 Jan. 10, 2019

(51) Int. Cl.
*H04N 21/442* (2011.01)
*H04N 21/4223* (2011.01)
(Continued)

(52) U.S. Cl.
CPC ... *H04N 21/44218* (2013.01); *H04N 21/2353* (2013.01); *H04N 21/4223* (2013.01);
(Continued)

(58) Field of Classification Search
CPC ......... H04N 21/44218; H04N 21/2353; H04N 21/4223; H04N 21/431; H04N 21/4325;
(Continued)

(56) References Cited

U.S. PATENT DOCUMENTS 5,792,971 A 8/1998 Timis et al.
6,622,174 B1 9/2003 Ukita et al.
(Continued)

FOREIGN PATENT DOCUMENTS

WO 2015/069267 A1 5/2015

OTHER PUBLICATIONS

Aschmann, Rick. "North American English Dialects, Based on Pronunciation Patterns," retrieved from http://www.aschmann.net/AmEng/, on Apr. 24, 2017, 57 pages.
(Continued)

*Primary Examiner* — Pinkal R Chokshi
(74) *Attorney, Agent, or Firm* — Seed Intellectual Property Law Group LLP

(57) ABSTRACT

A system and method of adjusting playback of content in response to a viewer's emotional reaction is disclosed. The method includes detecting viewer emotion, via a camera, in reaction to subject matter of the content being presented on a display screen. The content includes subject matter and metadata associated with the subject matter. Additionally, the method analyzes the viewer emotion in reaction to the subject matter of the content presented on the display screen and identifies the analyzed viewer emotion in reaction to the subject matter of the content. The method also associates an identified viewer emotion with at least one playback attribute linked with the presentation of the content using the metadata associated with the subject matter of the content presented on the display screen. Further, the method adjusts the at least one playback attribute linked with presentation of the content that corresponds with the identified viewer emotion.

20 Claims, 7 Drawing Sheets

(51) Int. Cl.
*H04N 21/431* (2011.01)
*H04N 21/472* (2011.01)
*H04N 21/235* (2011.01)
*H04N 21/485* (2011.01)
*H04N 21/432* (2011.01)

(52) U.S. Cl.
CPC ....... *H04N 21/431* (2013.01); *H04N 21/4325* (2013.01); *H04N 21/47217* (2013.01); *H04N 21/4852* (2013.01); *H04N 21/4854* (2013.01)

(58) Field of Classification Search
CPC ......... H04N 21/47217; H04N 21/4852; H04N 21/4854
See application file for complete search history.

(56) References Cited

U.S. PATENT DOCUMENTS

| | | |
|---|---|---|
| 6,921,336 B1 | 7/2005 | Best |
| 7,653,543 B1 | 1/2010 | Blair et al. |
| 7,712,125 B2 | 5/2010 | Herigstad et al. |
| 7,769,183 B2 | 8/2010 | Bharitkar et al. |
| 8,019,476 B2 | 9/2011 | Kondo |
| 8,065,701 B2 | 11/2011 | Hattori et al. |
| 8,135,963 B2 | 3/2012 | Sato et al. |
| 8,249,950 B2 | 8/2012 | Pasupulati et al. |
| 8,280,009 B2 | 10/2012 | Stepanian |
| 8,296,803 B2 | 10/2012 | Yamaoka et al. |
| 8,364,477 B2 | 1/2013 | Song et al. |
| 8,438,590 B2 | 5/2013 | Crenshaw |
| 8,462,645 B1 | 6/2013 | Harb |
| 8,531,050 B2 | 9/2013 | Barney et al. |
| 8,640,021 B2 | 1/2014 | Perez et al. |
| 8,670,030 B2 | 3/2014 | Tanaka |
| 8,677,391 B2 | 3/2014 | Tanaka et al. |
| 8,698,746 B1 | 4/2014 | Merrick |
| 8,740,708 B2 | 6/2014 | Karacal et al. |
| 8,830,170 B2 | 9/2014 | Kao et al. |
| 8,832,721 B2 | 9/2014 | Yeh |
| 8,854,447 B2 | 10/2014 | Conness et al. |
| 8,886,260 B2 | 11/2014 | Ryu et al. |
| 8,903,176 B2 | 12/2014 | Hill |
| 8,928,809 B2 | 1/2015 | Vanderhoff |
| 9,047,054 B1 | 6/2015 | Goldstein et al. |
| 9,099,972 B2 | 8/2015 | Gao et al. |
| 9,264,834 B2 | 2/2016 | Souldore |
| 9,357,308 B2 | 5/2016 | Freeman |
| 9,398,247 B2 | 7/2016 | Tateishi |
| 9,398,392 B2 | 7/2016 | Ridihalgh et al. |
| 9,426,538 B2 | 8/2016 | Byers |
| 9,514,481 B2 | 12/2016 | Kumar et al. |
| 9,516,259 B2 | 12/2016 | Zheng |
| 9,525,919 B2 | 12/2016 | Knudson et al. |
| 9,769,523 B2 | 9/2017 | Yeh |
| 10,088,983 B1* | 10/2018 | Qaddoura ........ H04N 21/23439 |
| 10,171,877 B1 | 1/2019 | Shah et al. |
| 10,466,955 B1* | 11/2019 | Gray ...................... G06F 3/165 |
| 10,616,650 B2 | 4/2020 | Shah et al. |
| 2002/0162120 A1 | 10/2002 | Mitchell |
| 2003/0032890 A1 | 2/2003 | Hazlett et al. |
| 2003/0093784 A1* | 5/2003 | Dimitrova .............. H04N 7/163 |
| | | 725/10 |
| 2003/0216177 A1 | 11/2003 | Aonuma et al. |
| 2004/0013252 A1 | 1/2004 | Craner |
| 2004/0199923 A1* | 10/2004 | Russek .................. G06F 16/58 |
| | | 719/310 |
| 2005/0079474 A1 | 4/2005 | Lowe |
| 2005/0210502 A1 | 9/2005 | Flickinger et al. |
| 2005/0288954 A1 | 12/2005 | McCarthy et al. |
| 2005/0289582 A1 | 12/2005 | Tavares et al. |
| 2006/0041472 A1 | 2/2006 | Lukose et al. |
| 2007/0022437 A1 | 1/2007 | Gerken |
| 2007/0052177 A1 | 3/2007 | Ikeda et al. |
| 2007/0060391 A1 | 3/2007 | Ikeda et al. |
| 2007/0124775 A1 | 5/2007 | DaCosta |
| 2007/0265507 A1 | 11/2007 | De Lemos |
| 2007/0271580 A1 | 11/2007 | Tischer et al. |
| 2008/0082510 A1 | 4/2008 | Wang et al. |
| 2008/0178241 A1 | 7/2008 | Gilboy |
| 2009/0067847 A1 | 3/2009 | Nakamura |
| 2009/0093784 A1 | 4/2009 | Hansen et al. |
| 2009/0133051 A1* | 5/2009 | Hildreth ............... H04N 5/4403 |
| | | 725/28 |
| 2009/0163274 A1 | 6/2009 | Kando |
| 2009/0195392 A1 | 8/2009 | Zalewski |
| 2009/0249388 A1 | 10/2009 | Seidel et al. |
| 2010/0060722 A1* | 3/2010 | Bell ........................ G06F 3/017 |
| | | 348/51 |
| 2010/0107075 A1 | 4/2010 | Hawthorne et al. |
| 2010/0192173 A1 | 7/2010 | Mizuki et al. |
| 2010/0199318 A1 | 8/2010 | Chang et al. |
| 2011/0142413 A1* | 6/2011 | Kang ...................... G11B 27/32 |
| | | 348/E5.002 |
| 2011/0190052 A1 | 8/2011 | Takeda et al. |
| 2011/0247042 A1 | 10/2011 | Mallinson |
| 2011/0279359 A1* | 11/2011 | McCarty ................. G06F 9/453 |
| | | 345/156 |
| 2012/0046767 A1 | 2/2012 | Shimohata et al. |
| 2012/0083942 A1* | 4/2012 | Gunaratne ............ B60W 40/02 |
| | | 701/1 |
| 2012/0123769 A1 | 5/2012 | Urata |
| 2012/0133582 A1 | 5/2012 | Ohsawa et al. |
| 2012/0143693 A1 | 6/2012 | Chung et al. |
| 2012/0192222 A1 | 7/2012 | Kumar et al. |
| 2012/0192228 A1 | 7/2012 | Zito et al. |
| 2012/0309515 A1 | 12/2012 | Chung et al. |
| 2013/0080260 A1 | 3/2013 | French et al. |
| 2013/0166587 A1* | 6/2013 | Berry .................... G06F 16/489 |
| | | 707/769 |
| 2013/0171897 A1 | 7/2013 | Hsu Tang |
| 2013/0194406 A1 | 8/2013 | Liu et al. |
| 2013/0205314 A1 | 8/2013 | Ramaswamy et al. |
| 2013/0238413 A1 | 9/2013 | Carlson et al. |
| 2013/0283162 A1* | 10/2013 | Aronsson ............ G11B 27/105 |
| | | 715/719 |
| 2013/0311270 A1 | 11/2013 | Daftary et al. |
| 2013/0335226 A1 | 12/2013 | Shen et al. |
| 2014/0052513 A1 | 2/2014 | Ryan et al. |
| 2014/0108135 A1 | 4/2014 | Osborn |
| 2014/0130076 A1* | 5/2014 | Moore ............... H04N 21/25883 |
| | | 725/19 |
| 2014/0149177 A1* | 5/2014 | Frank ...................... G06Q 10/06 |
| | | 705/7.29 |
| 2014/0168071 A1 | 6/2014 | Ahmed et al. |
| 2014/0223462 A1* | 8/2014 | Aimone ............... A61B 5/0476 |
| | | 725/10 |
| 2014/0280296 A1 | 9/2014 | Johnston et al. |
| 2014/0298364 A1* | 10/2014 | Stepanov ........... H04N 21/4668 |
| | | 725/10 |
| 2014/0309511 A1 | 10/2014 | Stål |
| 2014/0366049 A1* | 12/2014 | Lehtiniemi ....... H04N 21/44218 |
| | | 725/12 |
| 2015/0010169 A1 | 1/2015 | Popova |
| 2015/0020086 A1* | 1/2015 | Chen ................. H04N 21/44218 |
| | | 725/12 |
| 2015/0070516 A1 | 3/2015 | Shoemake et al. |
| 2015/0078595 A1 | 3/2015 | Shintani et al. |
| 2015/0121418 A1 | 4/2015 | Jain et al. |
| 2016/0101358 A1* | 4/2016 | Ibrahim ............ G06Q 10/0639 |
| | | 463/33 |
| 2016/0227280 A1 | 8/2016 | Candelore |
| 2016/0316059 A1 | 10/2016 | Nuta et al. |
| 2016/0323643 A1 | 11/2016 | Panchaksharaiah et al. |
| 2016/0337712 A1* | 11/2016 | An ..................... H04N 21/4532 |
| 2016/0350801 A1 | 12/2016 | Vincent et al. |
| 2017/0018008 A1 | 1/2017 | Hajiyev et al. |
| 2017/0046601 A1 | 2/2017 | Chang et al. |
| 2017/0053320 A1 | 2/2017 | Russek |
| 2017/0068423 A1* | 3/2017 | Napolitano ........... G06F 3/0482 |
| 2017/0098452 A1* | 4/2017 | Tracey .................... G10L 19/26 |
| 2017/0161014 A1* | 6/2017 | Kikugawa .............. G06F 3/165 |
| 2017/0264920 A1 | 9/2017 | Mickelsen |

(56) References Cited

U.S. PATENT DOCUMENTS

2018/0151198 A1* 5/2018 Yanagi ................. G11B 27/031
2018/0302686 A1* 10/2018 Bhattacharjee .... H04N 21/4532
2018/0338167 A1* 11/2018 Chi ..................... G11B 27/005
2019/0132647 A1   5/2019 Shah et al.
2020/0196014 A1   6/2020 Shah et al.

OTHER PUBLICATIONS

Labov, William, Sharon Ash, and Charles Boberg. "11: The Dialects of North American English." The Atlas of North American English: Phonetics, Phonology, and Sound Change: A Multimedia Reference Tool. Berlin: Mouton De Gruyter, 2006. 35 pages.

Wikipedia, "Auto-Tune," retrieved from http://en.wikipedia.org/wiki/auto-tune, on Mar. 16, 2017, 4 pages.

* cited by examiner

SYSTEM AND METHOD FOR DYNAMICALLY ADJUSTING CONTENT PLAYBACK BASED ON VIEWER EMOTIONS

BACKGROUND

Technical Field

The present disclosure relates generally to presenting content to a viewer via content output devices and, more particularly, to analyzing emotions of the viewer and adjusting the playback of the content to the viewer via the content output devices.

Description of the Related Art

Over the past several years, home-theater systems have greatly improved the presentation of content to viewers with respect to how viewers listen to and view content. This improvement has been aided by the number of content channels that are available to listen or watch at any given time, the quality of video and audio output devices, and the quality of the input signal carrying the content.

However, when it comes to a viewer's individual listening or viewing characteristics or preferences, viewers are typically limited to manually adjusting audio or video settings. Such manual adjustments may be time consuming and distracting to the viewer, especially if the viewer is frequently adjusting the viewing parameters, modifying different styles of content parameters, or modifying the types of content.

Additionally, there is no way currently to customize how content is presented to individual users, based upon the particular preferences of the users viewing the content. While there have been some attempts to customize what content is presented to a user, these techniques have been generally limited to (1) trying to identify the user by way of various means, and (2) accessing a profile which links the identified user to a certain genre of content. Such techniques are crude at best. They do not address the manner in which content is presented, only the nature of the content itself. Additionally, such techniques do not provide real-time feedback regarding a user's current viewing experience. As such, there is a continuing need in the art to address these and other issues.

BRIEF SUMMARY

Briefly stated, embodiments described herein are directed towards analyzing emotional reactions of a content viewer to the subject matter of the content being presented and adjusting at least one playback attribute of the content in response to the emotional reaction of the content viewer in order to improve the viewer's experience with the content. In at least one embodiment, the dynamical playback adjustment system and method customizes, via playback attribute adjustments, "how" content is presented to a viewer in reaction to viewer emotion, but not "what" content is presented to a viewer in reaction to viewer emotion. The dynamical playback adjustment system and method does not require the viewer to be identified and associated with a profile of viewer information, but rather the dynamical playback adjustment system and method identifies viewer emotion by comparing detected facial expressions of the viewer against stored facial expressions that are known to be associated with corresponding emotions.

In at least one embodiment, a viewer emotion analysis and dynamical playback adjustment method presents content to a viewer on a display screen from a content receiver. The content from the content receiver typically includes subject matter and metadata associated with the subject matter. Continuing, the viewer emotion analysis and dynamical playback adjustment method includes detecting viewer emotion, via a camera, in reaction to the subject matter of the content currently being presented on the display screen and analyzing the viewer emotion in reaction to the subject matter of the content presented on the display screen.

Next, the viewer emotion analysis and dynamical playback adjustment method identifies the analyzed viewer emotion in reaction to the subject matter of the content presented on the display screen, and associates an identified viewer emotion with at least one playback attribute linked with the presentation of the content using the metadata associated with the subject matter of the content presented on the display screen. Additionally, the viewer emotion analysis and dynamical playback adjustment method adjusts the playback attribute(s) linked with presentation of the content that corresponds with the identified viewer emotion; and outputs the content with the adjusted at least one playback attribute.

In some embodiments of the viewer emotion analysis and dynamical playback adjustment method, adjusting the at least one playback attribute comprises: adjusting a playback speed attribute of the content, adjusting a visual playback attribute of the content, adjusting an audio playback attribute of the content, or combinations thereof. In another embodiment of the viewer emotion analysis and dynamical playback adjustment method, adjusting a playback speed attribute of the content comprises: increasing the playback speed of the content, decreasing the playback speed of the content, repeating a portion of the content, and combinations thereof. In still another embodiment of the viewer emotion analysis and dynamical playback adjustment method, adjusting an audio playback attribute of the content comprises: increasing or decreasing an overall volume level, increasing or decreasing a dialog volume level, increasing or decreasing a surround sound volume level, changing a language setting, and combinations thereof. In yet another embodiment of the viewer emotion analysis and dynamical playback adjustment method, adjusting a visual playback attribute of the content comprises: increasing or decreasing a brightness level, increasing or decreasing a contrast level, changing a display setting for closed captions, changing a display setting for language subtitles, changing a display setting for a score during a sporting event, and combinations thereof.

In at least one embodiment of the viewer emotion analysis and dynamical playback adjustment method, detecting viewer emotions comprises detecting facial expressions that are used by an emotion analysis system to assist in viewer emotion analysis in reaction to presented content. In one aspect of such an embodiment, the emotion analysis system includes stored examples of facial expressions associated with different emotions. In another aspect of such an embodiment, analyzing the viewer emotion in reaction to the subject matter of the content presented on the display screen comprises: comparing the detected viewer emotion with the stored examples of facial expressions to assist in identifying the viewer emotions. Still another aspect of such an embodiment further comprises examining the metadata corresponding to the subject matter of the content causing the viewer emotion and using the corresponding metadata to narrow the option of possible emotions being identified by the emotion analysis system. Yet another aspect of such an embodiment further comprises using facial recognition to identify emotions without identifying a particular individual or profile.

In some embodiments of the viewer emotion analysis and dynamical playback adjustment method, each identified viewer emotion has one associated playback attribute adjustment. In other embodiments of the viewer emotion analysis and dynamical playback adjustment method, each identified viewer emotion has more than one associated playback attribute adjustment. Such embodiments may further comprise: examining the metadata corresponding to the subject matter of the content causing the viewer emotion, and determining an associated playback attribute adjustment from among the more than one associated playback attribute adjustments using a combination of identified viewer emotion and the subject matter of the content causing the viewer emotion.

In another aspect of at least one embodiment, the content is a movie, television show, or commercial that relates to a particular subject matter, and the particular subject matter of the content is unchanged when the at least one playback attribute is adjusted. Otherwise stated, the viewer emotion analysis and dynamical playback adjustment method does not change what content is being presented, instead the viewer emotion analysis and dynamical playback adjustment method adjusts a playback attribute relating to how the content is being presented.

In still another embodiment, a system that adjusts playback of content in response to a viewer's emotional reaction is disclosed. One such system includes: one or more cameras; one or more processors; and a memory device. The memory device stores a set of instructions that when executed by the one or more processors, causes the one or more processors to: detect viewer emotion, via the one or more cameras, in reaction to subject matter of the content being presented on a display screen. In some embodiments, the content includes subject matter and metadata associated with the subject matter. The executed instructions also cause the processor to analyze the viewer emotion in reaction to the subject matter of the content presented on the display screen and identify the analyzed viewer emotion in reaction to the subject matter of the content presented on the display screen. Additionally, the executed instructions also cause the processor to associate an identified viewer emotion with at least one playback attribute linked with the presentation of the content using the metadata associated with the subject matter of the content presented on the display screen. Furthermore, the executed instructions also cause the processor to adjust the at least one playback attribute linked with presentation of the content that corresponds with the identified viewer emotion.

In yet another embodiment, a viewer emotion analysis and dynamical playback adjustment method detects viewer emotion, via a camera, in reaction to subject matter of the content being presented on a display screen. The content includes subject matter and metadata associated with the subject matter. Additionally, the viewer emotion analysis and the dynamical playback adjustment method analyzes the viewer emotion in reaction to the subject matter of the content presented on the display screen and identifies the analyzed viewer emotion in reaction to the subject matter of the content presented on the display screen. Next, the viewer emotion analysis and dynamical playback adjustment method associates an identified viewer emotion with at least one playback attribute linked with the presentation of the content using the metadata associated with the subject matter of the content presented on the display screen. Further, the viewer emotion analysis and dynamical playback adjustment method adjusts the at least one playback attribute linked with presentation of the content that corresponds with the identified viewer emotion.

These features, with other technological improvements that will become subsequently apparent, reside in the details of construction and operation as more fully described hereafter and claimed, reference being had to the accompanying drawings forming a part hereof.

BRIEF DESCRIPTION OF THE SEVERAL VIEWS OF THE DRAWINGS

The present application will be more fully understood by reference to the following figures, which are for illustrative purposes only. The figures are not necessarily drawn to scale and elements of similar structures or functions are generally represented by like reference numerals for illustrative purposes throughout the figures. The figures do not describe every aspect of the teachings disclosed herein and do not limit the scope of the claims.

DETAILED DESCRIPTION

Each of the features and teachings disclosed herein may be utilized separately or in conjunction with other features and teachings to provide a viewer emotion analysis and dynamical playback adjustment system and method. Representative examples utilizing many of these additional features and teachings, both separately and in combination, are described in further detail with reference to the attached FIGS. 1-7. This detailed description is intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the dynamical playback adjustment system and method. However, it will be apparent to one skilled in the art that these specific details are not required to practice the teachings of the dynamical playback adjustment system and method. Also other methods and systems may also be used.

Figure 1:
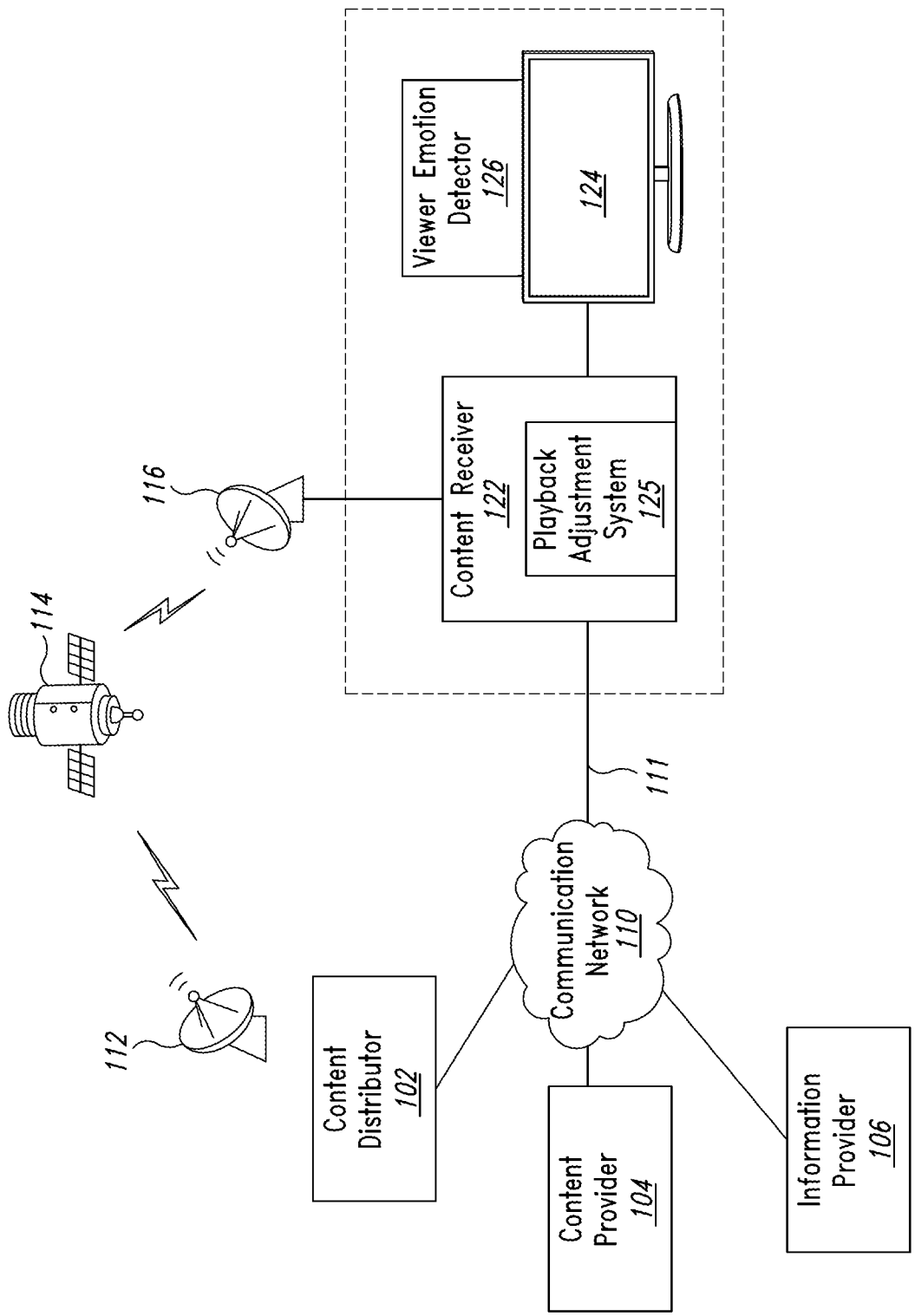
FIG. 1 illustrates a context diagram for providing content to a viewer in accordance with embodiments described herein.

FIG. 1 shows a context diagram of one embodiment for providing content to a viewer in accordance with embodiments described herein of the dynamical playback adjustment system and method. In this example, the context diagram shows a content distributor 102, a content provider 104, an information provider 106, and communication networks 110. In at least one embodiment, the dynamical playback adjustment system and method includes a playback adjustment system 125 and a viewer emotion detector 126.

Typically, content providers 104 generate, aggregate, and/or otherwise provide content that is provided to one or more viewers. Sometimes, content providers are referred to as "channels" or "stations." Examples of content providers 104 may include, but are not limited to: film studios; television studios; network broadcasting companies; independent content producers, such as AMC, HBO, Showtime, or the like; radio stations; or other entities that provide content for viewer consumption. A content provider may also include individuals that capture personal or home videos and distribute these videos to others over various online media-sharing websites or other distribution mechanisms. The content provided by content providers 104 may be referred to as the program content, which may include movies, sitcoms, reality shows, talk shows, game shows, documentaries, infomercials, news programs, sports programs, songs, audio tracks, albums, or the like. In this context, program content may also include commercials or other television or radio advertisements. It should be noted that the commercials may be added to the program content by the content providers 104 or the content distributor 102. Embodiments described herein generally refer to content, which includes audio content and visual content.

In at least one embodiment, information provider 106 creates and distributes data or other information that describes or supports content. Generally, this data is related to the program content provided by content provider 104. For example, this data may include, for example, metadata, program name, closed-caption authoring and placement within the program content, timeslot data, pay-per-view and related data, or other information that is associated with the program content. In some embodiments, a content distributor 102 may combine or otherwise associate the data from information provider 106 and the program content from content provider 104, which may be referred to as the distributed content or more generally as content. However, other entities may also combine or otherwise associate the program content and other data together.

In some embodiments, content distributor 102 provides the content, whether obtained from content provider 104 and/or the data from information provider 106, to a viewer through a variety of different distribution mechanisms. For example, in some embodiments, content distributor 102 may provide the content and data to a viewer's content receiver 122 directly through communication network 110 on link 111. In other embodiments, the content may be sent through uplink 112, which goes to satellite 114 and back to downlink station 116 that may also include a head end (not shown). The content is then sent to an individual content receiver 122 of a viewer/customer at viewer premises 120.

In at least one embodiment, communication network 110 is configured to couple various computing devices to transmit content/data from one or more devices to one or more other devices. For example, communication network 110 may be the Internet, X.25 networks, or a series of smaller or private connected networks that carry the content. Communication network 110 may include one or more wired or wireless networks.

In some embodiments, content receiver 122 is a device that receives the content from content distributor 102. Examples of content receiver 122 may include, but are not limited to, a set-top box, a cable connection box, a computer, television receiver, radio receiver, or other content receivers. Content receiver 122 may be configured to demultiplex the content and provide: (1) a visual component of the program content or other information to a viewer's display device 124, such as a television, monitor, or other display device, and (2) an audio component of the program content to the television or other audio output devices.

In one such embodiment, the dynamical playback adjustment system and method analyzes the content, such as the metadata or the video or audio components, to determine playback parameters of the content (e.g., overall volume of the playback, dialog volume of the playback, speed of the playback, language of the playback, brightness of the playback, subject matter clarity of the playback). In at least one embodiment, one or more playback attributes or parameters of the content are automatically adjusted for one or more content output devices based on the analysis of the viewer's emotions in response to the presented content, which is discussed in more detail below.

Figure 2:
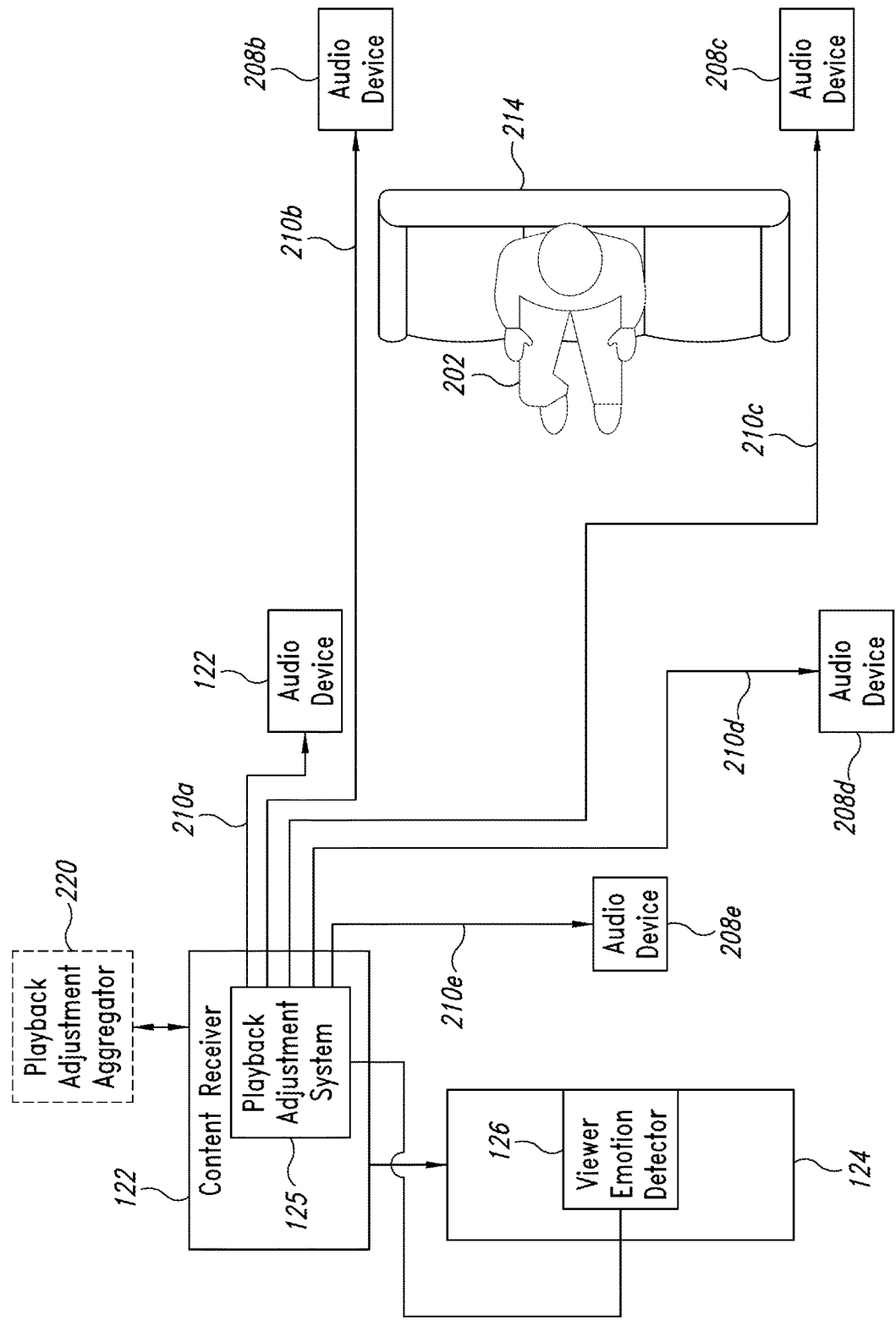
FIG. 2 is a context diagram of one non-limiting embodiment of a viewer's premises for presenting content to the viewer in accordance with embodiments described herein.

FIG. 2 is a context diagram of one non-limiting embodiment of a dynamical playback adjustment system and method that is implemented in a viewer's premises for presenting content to the viewer in accordance with embodiments described herein. In the displayed embodiment, the viewer's premise includes a content receiver 122, a display device 124, a playback adjustment system 125, a viewer emotion detector 126, and audio devices 208a-208e (collectively 208).

The content receiver 122 receives content from a content distributor, such as content distributor 102 described above. In at least one embodiment, the content receiver 122 includes a playback adjustment system 125. In other embodiments, the playback adjustment system 125 is a separate component that is in communication with the content receiver 122. The playback adjustment system 125 manages a video component of the received content to the display device 124 for rendering to a viewer 202 sitting on a couch 214. The playback adjustment system 125 also manages an audio component of the received content for output to the audio devices 208a-208e.

Figure 3:
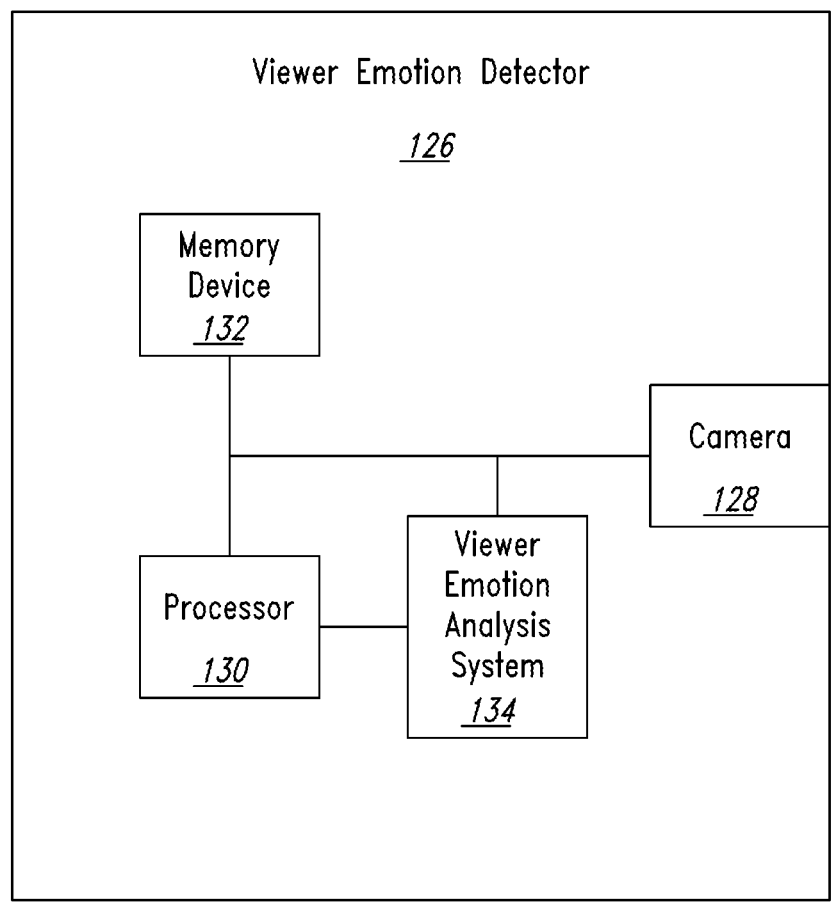
FIG. 3 illustrates a viewer emotion detection system in accordance with embodiments described herein.

As shown in FIG. 3, in one aspect of the dynamical playback adjustment system and method, the viewer emotion detector 126 may include one or more cameras 128. The one or more cameras 128 may include an image camera, a video camera, an image and video camera, or combinations thereof. According to one embodiment, the viewer emotion detector 126 may further include a processor 130 that is in communication with the one or more cameras 128. Notably, in some embodiments the processor 130 is a separate component in communication with the viewer emotion detector 126.

In an embodiment that includes an image camera, the image camera captures individual images of facial expressions that may be used to analyze and identify emotions of the viewer. In an embodiment that includes a video camera, the video camera captures video segments of facial expressions that may be used to analyze and identify emotions of the viewer. With some viewers and/or with some emotions, the capture of video segments may be of greater assistance in analyzing and identifying emotions since the viewer emotion detector 126 may more accurately detect how the facial expressions change over a period of time.

In another aspect of the dynamical playback adjustment system and method, time-based data capture of facial expressions relating to emotions is collected and compared to event metadata and playback speed. This process is repeated every time a viewer watches the content, so the emotion linkage with the event metadata in the content is stored and enriched with every viewing of the content. The time-based data capture of facial expressions that relates to emotions is transferred to a storage system, such as a server. The dynamical playback adjustment system and method then performs a machine learning process on the aggregate data and builds playback threshold models for content and viewers. These playback threshold models are used to set playback speed attributes, playback visual attributes, and/or playback audio attributes that are associated with the identified emotions of the content viewers. Since this process is repeated every time a viewer watches the content, the playback threshold models are improved with every viewing of the content.

In another embodiment, the viewer emotion detector 126 may further include a memory device 132 that stores instructions which may be executed by the processor 130, and cause the processor to analyze images or video segments captured by the image camera and/or video cameras. Notably, in some embodiments the memory device 132 is a separate component in communication with the viewer emotion detector 126 and the processor 130. In another embodiment, the memory device 132 is integrated into the processor 130 and/or the viewer emotion detector 126.

Referring again to FIG. 2, in another aspect of the dynamical playback adjustment system and method, the playback adjustment system 125 is configured to adjust at least one playback attribute selected from the group of (1) playback speed attribute adjustments of the content, (2) visual playback attribute adjustments of the content, (3) audio playback attribute adjustments of the content, or (4) combinations thereof. The playback speed attribute adjustments of the content include, by way of example only and not by way of limitation: increasing the playback speed of the content, decreasing the playback speed of the content, repeating a portion of the content, and combinations thereof. The audio playback attribute adjustments of the content include, by way of example only and not by way of limitation: increasing or decreasing an overall volume level, increasing or decreasing a dialog volume level, increasing or decreasing a surround sound volume level, changing a language setting, or combinations thereof. The visual playback attribute adjustments of the content include, by way of example only and not by way of limitation: increasing or decreasing a brightness level, increasing or decreasing a contrast level, changing a display setting for closed captions, changing a display setting for language subtitles, changing a display setting for a score during a sporting event, and combinations thereof.

In various embodiments, the playback adjustment system 125 separates the audio component of the content into multiple separate audio channels, where each separate audio channel is provided to a separate audio device 208a-208e via communication links 210a-210e, respectively. In some situations there may be more or less audio channels than the number of audio devices 208. If there are too many audio channels, then some audio channels may be ignored or some audio channels may be overlaid on each other, or otherwise combined, so that all audio associated with the received content is output via the one or more audio devices 208. If there are too few audio channels, one or more audio channels may be duplicated and provided to multiple audio devices 208 so that each audio device 208 is outputting some part of the audio component, or one or more of the audio devices 208 may not receive an audio channel.

In addition to separating the audio component into separate audio channels, the playback adjustment system 125 is configured to adjust at least one audio attribute of each separate audio channel. Accordingly, one or more audio attributes of each separate audio channel may be adjusted independent of one another or relative to one another. The types of audio attributes that may be adjusted may include, but are not limited to, overall volume, dialog volume, base control, treble control, phase or delay adjustments, tone or frequency adjustments, or other types of equalizer adjustments that change the sound produced by an audio device or the sound perceived by a viewer.

Audio attributes may be adjusted throughout the presentation of content to the viewer 202. For example, as discussed in more detail below, audio attributes are also adjusted based on the emotions of the viewer or on the emotions of the viewer in combination with the content that is causing the emotions of the viewer. Accordingly, adjustments to the audio attributes may be determined in association with the changes in the presented content.

In various embodiments, content receiver 122 communicates with playback adjustment aggregator 220 to receive one or more playback attribute adjustments for use by the playback adjustment system 125. In other embodiments, the content receiver 122 provides playback attribute adjustments made by viewers 202 to the playback adjustment aggregator 220. In this way, playback attribute adjustments made by multiple viewers may be aggregated and shared with other viewers as a type of learning or feedback as to the best or most popular playback attribute adjustments. The playback adjustment aggregator 220 may be remote to the dynamical playback adjustment system. In at least one embodiment, the playback adjustment aggregator 220 is integrated into or part of the content distributor 102.

Referring now to FIG. 3, in another aspect of some embodiments, the dynamical playback adjustment system and method includes a viewer emotion analysis system 134. As discussed above, the content may be received from a content distributor or other content provider via a wired connection over a communication network or via a satellite link or other wireless connection.

In some embodiments, the viewer emotion analysis system 134 may further include a facial expression engine in communication with a facial expressions library. The facial expressions library includes a collection of facial expression examples, and information concerning the facial expression examples. In one embodiment, the facial expression engine may compare the data captured by the camera 128 in the viewer emotion detector 126 to the facial expression examples in the facial expressions library to identify a viewer's facial expression. The viewer emotion analysis system 134 may then determine the emotion with the stored facial expression examples that most closely correlate with the viewer emotional reaction data captured by the camera 128.

The facial expression engine and facial expression library together may be used to determine a viewer's emotional reaction to content being presented. For example, the facial expression library may include stored facial expression examples for identifying when a viewer is feeling anger, contempt, disgust, fear, happiness, neutrality, sadness, surprise, confusion, boredom, as well as other visual indicators associated with a particular emotional reaction.

In some embodiments, the subject matter of the content causing the viewer emotion is used to assist the facial expression engine in determining the identified viewer emotion in combination with the comparison of the stored facial expression examples of the viewer facial expressions captured by the camera 128. For example, in one embodiment the viewer emotion analysis system 134 may include ten different identifiable emotions, but during the playback of certain subject matter (e.g., commercials, long background scenes with no dialog, and the like) the viewer emotion analysis system 134 may weigh the probability of a certain emotion (i.e., boredom) as more likely to be identified than in response to the playback of default subject matter.

In another embodiment, the viewer emotion analysis system 134 may include ten different identifiable emotions, but during the playback of certain subject matter the viewer emotion analysis system 134 only select from three different identifiable emotions that statistically have been the most common emotional reactions as determined from previous viewings of the content. In this regard, the viewer emotion analysis system 134 employs machine learning to improve the accuracy of emotion related facial expression analysis and identification over time. In still another aspect of the some embodiment, the viewer emotion analysis system 134 may be modified to set a particular confidence level of how accurately the detected facial expressions match the stored facial expression examples. If that particular confidence level is not achieved, then the dynamical playback adjustment system and method will not adjust any playback attributes.

The operation of certain aspects of the dynamical playback adjustment system and method will now be described with respect to FIGS. 4-6. In at least one of various embodiments, processes 400, 500, and 600 described in conjunction with FIGS. 4-6, respectively, may be implemented by or executed on one or more computing devices, such as content receiver 122, the playback adjustment system 125, and the viewer emotion detector 126.

Figure 4:
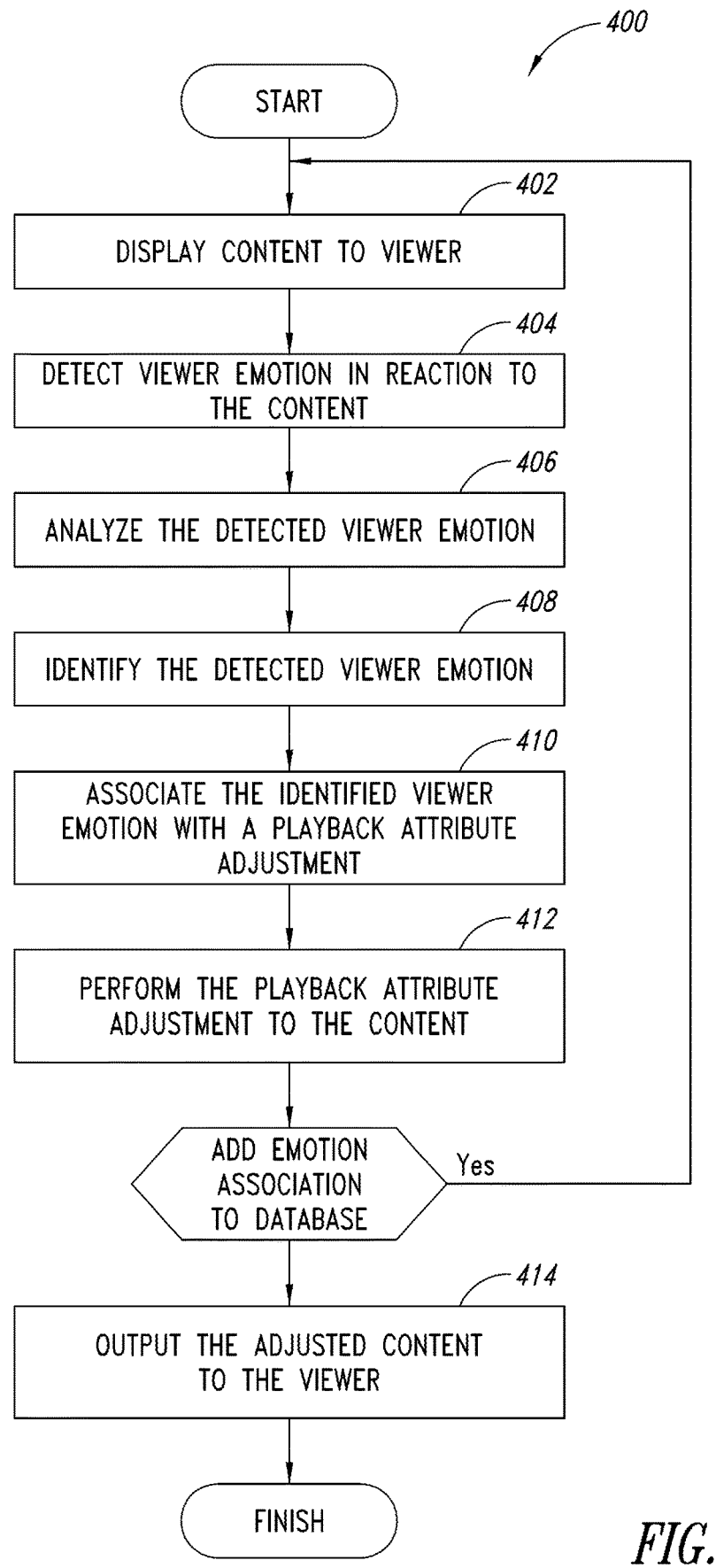
FIG. 4 illustrates a logical flow diagram showing one embodiment of a process for analyzing viewer emotion and adjusting playback speed attributes of the content.

FIG. 4 illustrates a logical flow diagram showing a process for automatically adjusting one or more playback speed attributes for one or more content output devices based on the analysis of the viewer's emotions in response to the presented content. As shown in FIG. 4, one embodiment of the dynamical playback adjustment method begins at block 402, where content is being presented to the viewer in a default content playback status. In various embodiments, the content receiver 122 tracks the corresponding metadata of the content as the content is being presented so that the playback adjustment system 125 may correlate the subject matter in the content with the reaction emotions of the viewer to the content. In some embodiments, the content is presented to the viewer using one or more display devices 124 and one or more audio devices 208.

The dynamical playback adjustment method 400 then proceeds to block 404, where viewer emotion is detected in reaction to the presented content. In some embodiments, the viewer emotion analysis system 134 is used to detect the emotional reaction of the viewer to the subject matter of the content. As discussed above, the content has corresponding metadata that includes a plurality of different information about the content, including the subject matter of the content. For example, the metadata may include a title of the content, a length of the content, a genre of the content, a list of actors or actresses, or other information.

Continuing, the dynamical playback adjustment method 400 then proceeds to block 406, where the detected viewer emotion in reaction to presented content is analyzed. In this regard, the viewer emotion analysis system 134 is used to analyze the emotional reaction of the viewer to the subject matter of the content. Notably, the dynamical playback adjustment system and method does not require the viewer to be identified and associated with a profile of viewer information. Instead, the viewer emotion analysis system 134 stores information that includes numerous examples of various facial expressions that are associated with corresponding emotions. Those various facial expressions that are associated with corresponding emotions may be compared against the facial expressions observed with the emotional reaction of the viewer to the subject matter of the content. In this manner, facial expressions observed with the emotional reaction of the viewer to the subject matter of the content are analyzed. In some embodiments, the viewer emotion analysis system 134 may apply known facial expression/emotion rules that assist in correlating stored facial expression/emotion information with observed feature/emotion information. In another aspect of the dynamical playback adjustment method, over time the viewer emotion analysis system 134 may perform machine learning to increase the accuracy of the facial expression/emotion analysis.

There are numerous examples of systems that monitor a user's facial expressions, body language, or the like to determine the user's mood and/or emotional stage such as U.S. Pat. No. 8,640,021 to Microsoft Corp. of Redmond, Wash.; U.S. Patent Publication No. 20140280296 to Google Inc. of Mountain View, Calif.; and U.S. Patent Publication No. 20160227280 to Sony Corp. of Tokyo, Japan.

Next, the dynamical playback adjustment method 400 proceeds to block 408, where the analyzed viewer emotions that are displayed in response to the presented content are identified. As described above, the viewer emotion analysis system 134 observes various facial expressions that are associated with corresponding emotional reaction of the viewer to the subject matter of the content. After the facial expressions observed from the emotional reaction of the viewer to the subject matter of the content are analyzed, the emotion of the viewer is identified by the viewer emotion analysis system 134. In some embodiments, these emotions may be selected from a group that includes anger, contempt, disgust, fear, happiness, neutrality, sadness, surprise, confusion, and boredom. In at least one embodiment, a viewer may use an input device to enter correction information if the viewer feels that the viewer emotion analysis system 134 is not accurately identifying the viewer's reaction emotions. This type of viewer feedback information may be used to validate computer learning models. In another aspect of some embodiments of the dynamical playback adjustment method, the emotional identification may be assisted by accessing previous correction information by the viewer or by other viewers while the current content was presented.

The dynamical playback adjustment method 400 then proceeds to block 410, where the identified viewer emotion is associated with a linked playback action. In this aspect of the dynamical playback adjustment method, the linked playback actions may include increasing the speed of playback, decreasing the speed of playback, repeating a portion of the playback, and the like.

In this manner, the dynamical playback adjustment system and method acts as a user customizable playback attribute adjustment system that may automatically customize the playback of content without the viewer even knowing that customization is occurring via playback attribute adjustments. These customizations are based on the dynamic, real-time, emotional reaction of the viewer to the content being presented to the viewer, not the identity of the viewer.

Additionally, these customizations, which are based on the dynamic, real-time, emotional reaction of the viewer to the content being presented to the viewer, adjust a parameter of the content (e.g., playback speed, visual attributes, audio attributes, or combinations thereof), but do not replace the original content with different content.

For example, in one embodiment where the content is the movie STAR WARS, the dynamical playback adjustment system and method enables the customization of playback attributes, such as modifying the speed of playback, lighting levels, use of closed captions, volume levels, language settings, and combinations thereof. However, in such an embodiment, the dynamical playback adjustment system and method does not ever change the content from the movie STAR WARS to a different movie, nor does the dynamical playback adjustment system and method ever change to an edited version of STAR WARS (e.g., an extended "director's cut" version, a television version with deleted scenes, or the like). Otherwise stated, the dynamical playback adjustment system and method customizes "how" content is presented to a viewer in reaction to viewer emotion, but not "what" content is presented to a viewer in reaction to viewer emotion.

Continuing, in one embodiment where the content is the movie STAR WARS, the dynamical playback adjustment system and method decreases the playback speed, in reaction to detecting and identifying that the viewer's emotional reaction to the presented content is "joy." In this example, the playback speed is decreased to lengthen the period of enjoyment for the viewer. In another embodiment where the content is the movie STAR WARS, the dynamical playback adjustment system and method decreases the playback speed, in reaction to detecting and identifying that the viewer's emotional reaction to the presented content is "excitement." In this example, the playback speed is decreased to help build the feeling of "suspense."

In one embodiment of the dynamical playback adjustment system and method 400, the playback speed of the presented content is increased in response to an analysis of the viewer's emotional reaction to the presented content. For example, in one such embodiment the dynamical playback adjustment system and method is configured to increase the playback speed if the viewer's emotional reaction to the presented content is the emotion of "boredom." In this example, the playback speed is increased to shorten the period of time that the viewer has to watch content that the viewer considers to be "boring."

In another embodiment of the dynamical playback adjustment system and method, the playback speed of the presented content is decreased in response to an analysis of the viewer's emotional reaction to the presented content. For example, in one such embodiment, the dynamical playback adjustment system and method is configured to decrease the playback speed if the viewer's emotional reaction to the presented content is the emotion of "surprise." In this example, the playback speed is decreased to lengthen the period of time that the viewer watches this portion of the content and enhance the feeling of "surprise."

In still another embodiment of the dynamical playback adjustment system and method, the playback of a portion the presented content is repeated in response to an analysis of the viewer's emotional reaction to the presented content. For example, in one such embodiment the dynamical playback adjustment system and method is configured to repeat a portion of the playback if the viewer's emotional reaction to the presented content is the emotion of "confusion." In this example, a portion of the content is repeated to lengthen the period of time that the viewer is able to watch this portion of the content and more fully understand what is occurring in the content to help alleviate the viewer's confusion.

In some embodiments of the dynamical playback adjustment system and method, there are different "degrees" of speed playback attribute adjustments for the decrease in the playback speed. Regarding one embodiment of the dynamical playback adjustment system and method, one speed playback attribute adjustment is a minor decrease in speed that is barely perceptible but subconsciously draws in the viewer with a feeling that "something different" is happening. Conversely, in another embodiment of the dynamical playback adjustment system and method, another speed playback attribute adjustment is a major decrease in speed that is very perceptible and consciously makes the viewer aware that they are getting to extend the length of this particular scene which they are enjoying.

In other embodiments of the dynamical playback adjustment system and method, there are different "degrees" of speed playback attribute adjustments for the increase in the playback speed. Regarding one embodiment of the dynamical playback adjustment system and method, one speed playback attribute adjustment is a minor increase in speed that is barely perceptible but subconsciously draws in the viewer with a feeling that "something different" is happening. Conversely, in another embodiment of the dynamical playback adjustment system and method, another speed playback attribute adjustment is a major increase in speed that is very perceptible and consciously makes the viewer aware that the length of this particular scene which they are not enjoying is being shortened.

Each identified emotional reaction may have a single corresponding playback action, such as the identified emotion of "boredom" causing increased playback speed, the identified emotion of "surprise" causing decreased playback speed, the identified emotion of "disgust" causing increased playback speed, the identified emotion of "confusion" causing decreased playback speed, and the like. Alternatively, each identified emotional reaction may have more than one corresponding playback action, such that a combination of identified emotional reaction and current subject matter of the content result in one corresponding playback action, such as the identified emotion of "anger" causing increased playback speed in reaction to the presented content of a commercial, but the identified emotion of "anger" causing the default playback speed to be maintained in reaction to presented content that is an action/adventure movie.

In another aspect of the some embodiments, the dynamical playback adjustment system and method may access the metadata associated with the content currently being presented in order to narrow down the possibilities of the emotional reaction of the viewer. For example, during a particularly violent or gory scene in presented content, the viewer emotion analysis system 134 may be weighted to watch for (1) the emotion of disgust, which would cause the dynamical playback adjustment method to increase the speed of playback or (2) the emotion of happiness, which would cause the dynamical playback adjustment method to maintain the default speed of playback. In another example, during a commercial or a particularly slow-moving scene in presented content, the viewer emotion analysis system 134 may be weighted to watch for (1) the emotion of happiness, which would cause the dynamical playback adjustment method to maintain the default speed of playback or (2) the emotion of boredom, which would cause the dynamical playback adjustment method to increase the speed of playback.

In still another aspect of the some embodiments, while the dynamical playback adjustment system and method may access the metadata associated with the content currently being presented, the metadata does not completely control the playback attribute adjustment that is made. In this regard, the same metadata from the same content, watched by different viewers, may result in different emotional reactions, and thus, different playback attribute adjustments.

In one such embodiment of the dynamical playback adjustment system and method, the content includes dance scenes and fight scenes. In this regard, different viewers may have opposite reactions to same content, and thus, the same metadata associated with the subject matter of the content. For example, when Viewer A watches a dance scene, this Viewer displays the emotion of "boredom" and one embodiment of the dynamical playback adjustment system and method increases the speed of playback in response. Continuing, when Viewer A watches a fight scene, this Viewer displays the emotion of "excitement" and one embodiment of the dynamical playback adjustment system and method decreases the speed of playback in response.

In contrast, when Viewer B watches a dance scene, this Viewer displays the emotion of "excitement" and one embodiment of the dynamical playback adjustment system and method decreases the speed of playback in response. Continuing, when Viewer B watches a fight scene, this Viewer displays the emotion of "boredom" and one embodiment of the dynamical playback adjustment system and method increases the speed of playback in response.

Referring again to the same embodiment of the dynamical playback adjustment system and method in which the content includes dance scenes and fight scenes, a same viewer may have one emotional reaction to specific content during a first time period, but have a different emotional reaction to the same specific content during a later time period.

For example, when Viewer C watches a dance scene during week one, this Viewer displays the emotion of "boredom" and one embodiment of the dynamical playback adjustment system and method increases the speed of playback in response. Continuing, when Viewer C watches a fight scene during week one, this Viewer displays the emotion of "excitement" and one embodiment of the dynamical playback adjustment system and method decreases the speed of playback in response. Later, potentially after Viewer C has had an emotion altering event occur, when Viewer C watches a dance scene during week two, this Viewer displays the emotion of "excitement" and one embodiment of the dynamical playback adjustment system and method decreases the speed of playback in response. Continuing, when Viewer C watches a fight scene during week two, this Viewer displays the emotion of "boredom" and one embodiment of the dynamical playback adjustment system and method increases the speed of playback in response.

The dynamical playback adjustment system and method customizes, via playback attribute adjustments, the presented content that includes dance scenes and fight scenes to Viewer C appropriately because the dynamical playback adjustment system and method identifies the emotion of the viewer dynamically in reaction to the current presentation of the content, unlike some traditional systems that merely attempted to identify the viewer and then access a preference profile of the viewer.

Next, the dynamical playback adjustment method 400 proceeds to block 412, where the linked playback action (i.e., speed playback attribute adjustment) is executed. In this aspect of the dynamical playback adjustment method, the playback adjustment system 125 is in communication with the display device 124 and the audio devices 208 to adjust the playback speed of the content, as directed by the associated emotional reaction of the viewer. In some embodiments, the dynamical playback adjustment method incrementally adjusts the playback speed which makes the playback speed transition less jerky and more seamless to the viewer. In another aspect of some embodiments, when the playback speed is adjusted by the dynamical playback adjustment method, the audio track is pitch-shifted close to the tone of the original playback rate.

After block 412, process 400 may loop back to block 402 to store the identified emotion linkage with the event metadata in the content, thus enriching the content presentation with adjusted speed playback attributes for every viewing of the content. Since the emotions of the viewer of the content may change over time as the different content is viewed, process 400 may continually execute and dynamically adjust the speed playback attributes based on the current emotions of the viewer of the content throughout the entire presentation of the content. In other embodiments, the process 400 does not loop back to block 402, but instead only proceeds to block 414.

Additionally or alternatively, the dynamical playback adjustment method 400 may proceed to block 414, where the content with the adjusted speed playback attribute(s) is output to the viewer via the display device 124 and audio devices 208. In this regard, the content with the adjusted speed playback attribute(s) that is output to the viewer is now in a modified format that is constituted to improve the emotive satisfaction of the viewer with the content.

Figure 5:
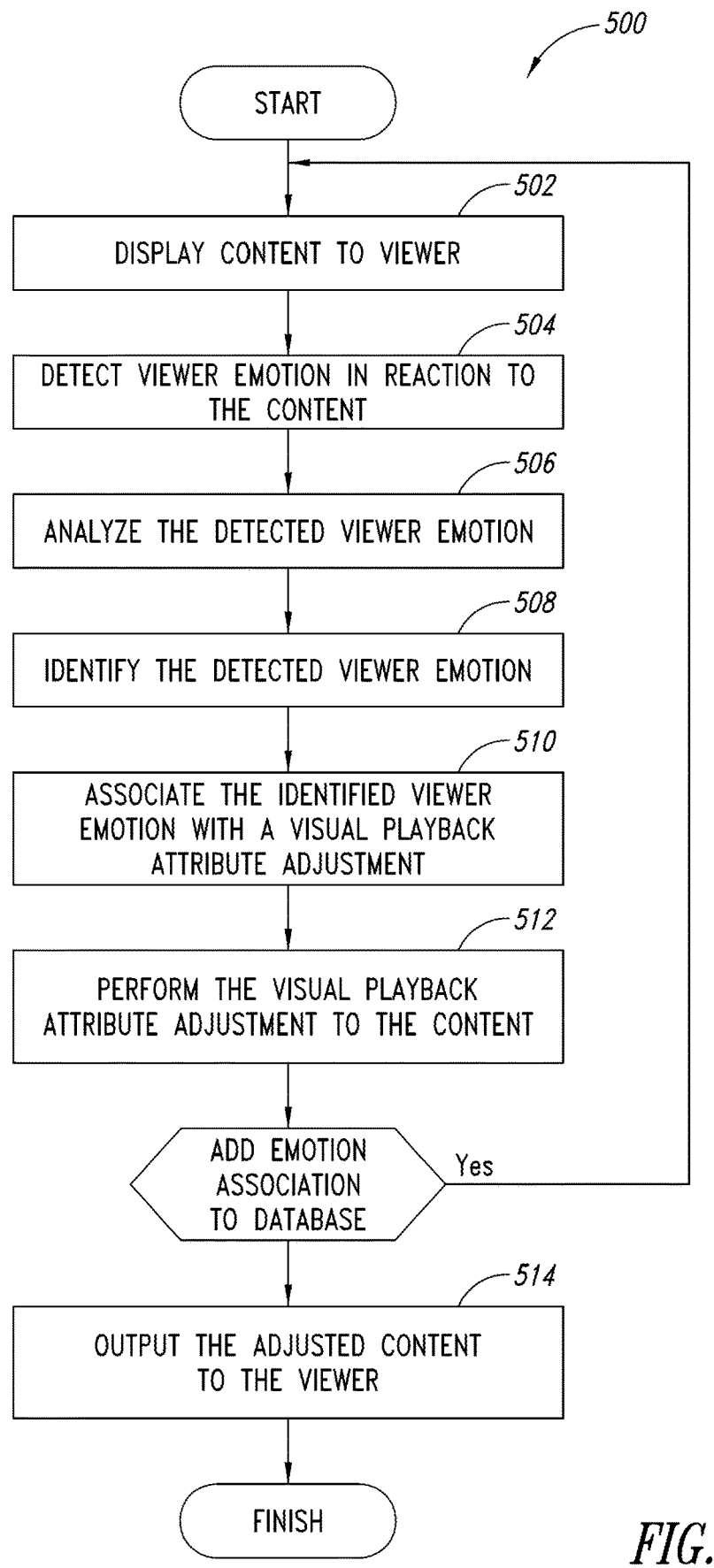
FIG. 5 illustrates a logical flow diagram showing one embodiment of a process for analyzing viewer emotion and adjusting playback visual attributes of the content.

Referring now to FIG. 5, a logical flow diagram is illustrated that shows a process for automatically adjusting one or more playback video attributes for one or more content output devices based on the analysis of the viewer's emotions in response to the presented content. In one embodiment of the dynamical playback adjustment system and method 500, one or more visual playback attributes for one or more content output devices are automatically adjusted based on the analysis of the viewer's emotional reaction to the presented content.

Most of the dynamical playback adjustment system and method 500 is similar to the dynamical playback adjustment system and method 400. At block 502, content is presented to the viewer in a default content playback status with no visual changes to the content. The dynamical playback adjustment method 500 then proceeds to block 504, where viewer emotion is detected in reaction to the presented content. At block 506, the viewer emotion detected in reaction to presented content is analyzed. The dynamical playback adjustment method 500 then proceeds to block 508, where the analyzed viewer emotions that are displayed in response to the presented content are identified. At block 510, the identified viewer emotion is associated with a linked playback action (i.e., visual playback attribute adjustment).

Next, the dynamical playback adjustment method 500 proceeds to block 512, where the linked playback action is executed. The linked playback action may include adjusting one or more visual playback attributes including, by way of example only, and not by way of limitation: brightness, contrast, display of closed captions, display of language subtitles, display of score during a sporting event, and the like. In this aspect of the dynamical playback adjustment method, the playback adjustment system 125 is in communication with the display device 124 to adjust one or more visual playback attributes of the content, as directed by the associated emotional reaction of the viewer.

For example, in one such embodiment the dynamical playback adjustment system and method is configured to increase the visual playback attribute of "brightness" or "contrast" if the viewer's emotional reaction to the presented content is the emotion "boredom." In this example, the visual playback attribute of "brightness" or "contrast" is modified to pique the attention of a viewer that has become bored watching a portion of the content. In another example, the dynamical playback adjustment system and method is configured to adjust the visual playback attribute by turning on "closed captions" if the viewer's emotional reaction to the presented content is the emotion "confusion." In this example, the visual playback attribute of "closed caption" settings is turned on to enable a viewer to see a visual presentation of the dialog in the content and help alleviate the viewer's confusion.

In still another example, the dynamical playback adjustment system and method is configured to adjust the visual playback attribute by turning on the display of a score during a sporting event if the viewer's emotional reaction to the presented content is the emotion "frustration" and the viewer is watching a sporting event. In this example, the visual playback attribute of turning on the display of the score during the sporting event enables a viewer to see a visual presentation of the score during the sporting event and help alleviate the viewer's frustration from not knowing the score. Furthermore, in such an example, the dynamical playback adjustment system and method may examine the dialog and metadata associated with the content, and determine that the score of the sporting event has not been recited for a certain period of time. This determination by the dynamical playback adjustment system and method of a lack of recitation of the score in the sporting event, in combination with the viewer's identified emotional reaction of "frustration," may actuate the visual playback attribute adjustment of turning on the display of the score during the sporting event.

After block 512, process 500 may loop back to block 502 to store the identified emotion linkage with the event metadata in the content, thus enriching the content presentation with adjusted visual playback attributes for every viewing of the content. Since the emotions of the viewer of the content may change over time as the different content is viewed, process 500 may continually execute and dynamically adjust the visual playback attributes based on the current emotions of the viewer of the content throughout the entire presentation of the content. In other embodiments, the process 500 does not loop back to block 502, but instead only proceeds to block 514.

Additionally or alternatively, the dynamical playback adjustment method 500 may proceed to block 514, where the content with the adjusted visual playback attribute(s) is output to the viewer via a display device 124. In this regard, the content with the adjusted visual playback attribute(s) that is output to the viewer is now in a modified format that is constituted to improve the emotive satisfaction of the viewer with the content.

Figure 6:
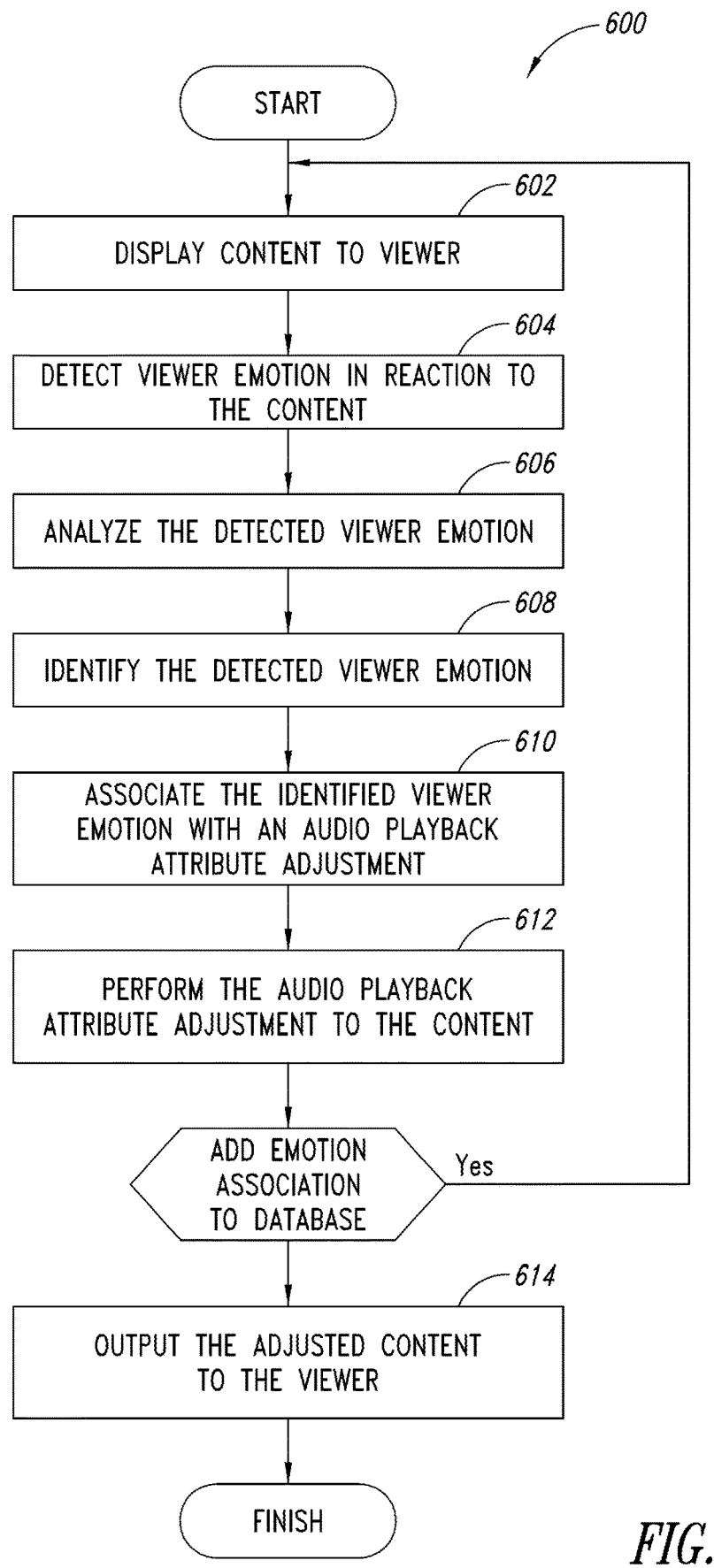
FIG. 6 illustrates a logical flow diagram showing one embodiment of a process for analyzing viewer emotion and adjusting playback audio attributes of the content.

Referring now to FIG. 6, a logical flow diagram is illustrated that shows a process for automatically adjusting one or more audio playback attributes for one or more audio devices based on the analysis of the viewer's emotions in response to the presented content. In one embodiment of the dynamical playback adjustment system and method 600, one or more audio playback attributes for one or more audio devices are automatically adjusted based on the analysis of the viewer's emotional reaction to the presented content.

Most of the dynamical playback adjustment system and method 600 is similar to the dynamical playback adjustment systems and methods 400 and 500. At block 602, content is presented to the viewer in a default content playback status with no visual changes to the content. The dynamical playback adjustment method 600 then proceeds to block 604, where viewer emotion is detected in reaction to the presented content. At block 606, the viewer emotion detected in reaction to presented content is analyzed. The dynamical playback adjustment method 600 then proceeds to block 608, where the analyzed viewer emotions that are displayed in response to the presented content are identified. At block 610, the identified viewer emotion is associated with a linked playback action (i.e., audio playback attribute adjustment).

Next, the dynamical playback adjustment method 600 then proceeds to block 612, where the linked playback action is executed. The linked playback action may include adjusting one or more audio playback attributes including, by way of example only, and not by way of limitation: overall volume, dialog volume, surround sound volume, language selection settings, and the like. In this aspect of the dynamical playback adjustment method, the playback adjustment system 125 is in communication with the audio devices 208 to adjust one or more audio playback attributes of the content, as directed by the associated emotional reaction of the viewer.

For example, in one such embodiment, the dynamical playback adjustment system and method is configured to increase the audio playback attribute of "dialog volume" if the viewer's emotional reaction to the presented content is the emotion "frustration." In this example, the audio playback attribute of "dialog volume" is increased to improve the viewer's ability to hear the dialog in the content and help alleviate the viewer's frustration.

In another embodiment, the dynamical playback adjustment system and method is configured to adjust the audio playback attribute by changing the language setting if the viewer's emotional reaction to the presented content is the emotion "confusion." In this example, the audio playback attribute of changing the language setting is changed to improve the viewer's ability to understand the dialog in the content and remedy the viewer's confusion due to an undesirable language setting.

In still another embodiment, the dynamical playback adjustment system and method is configured to decrease the audio playback attribute of "overall volume" if the viewer's emotional reaction to the presented content is the emotion "fear." In this example, the audio playback attribute of "overall volume" is decreased to alleviate the viewer's fear from the overall volume of the content being overwhelming.

After block 612, process 600 may loop back to block 602 to store the identified emotion linkage with the event metadata in the content, thus enriching the content presentation with adjusted audio playback attributes for every viewing of the content. Since the emotions of the viewer of the content may change over time as the different content is viewed, process 600 may continually execute and dynamically adjust the audio playback attributes based on the current emotions of the viewer of the content throughout the entire presentation of the content. In other embodiments, the process 600 does not loop back to block 602, but instead only proceeds to block 614.

Additionally or alternatively, the dynamical playback adjustment method 600 may proceed to block 614, where the content with the adjusted audio playback attribute(s) is output to the viewer via the audio devices 208. In this regard, the content with the adjusted audio playback attribute(s) that is output to the viewer is now in a modified format that is constituted to improve the emotive satisfaction of the viewer with the content.

Notably, in one embodiment of the dynamical playback adjustment system and method, the playback attribute adjustment of the content includes a speed playback attribute adjustment and a visual playback attribute adjustment. In another embodiment of the dynamical playback adjustment system and method, the playback attribute adjustment of the content includes a speed playback attribute adjustment and an audio playback attribute adjustment. In still another embodiment of the dynamical playback adjustment system and method, the playback attribute adjustment of the content includes a visual playback attribute adjustment and an audio playback attribute adjustment. In yet another embodiment of the dynamical playback adjustment system and method, the playback attribute adjustment of the content includes a speed playback attribute adjustment, a visual playback attribute adjustment, and an audio playback attribute adjustment.

Figure 7:
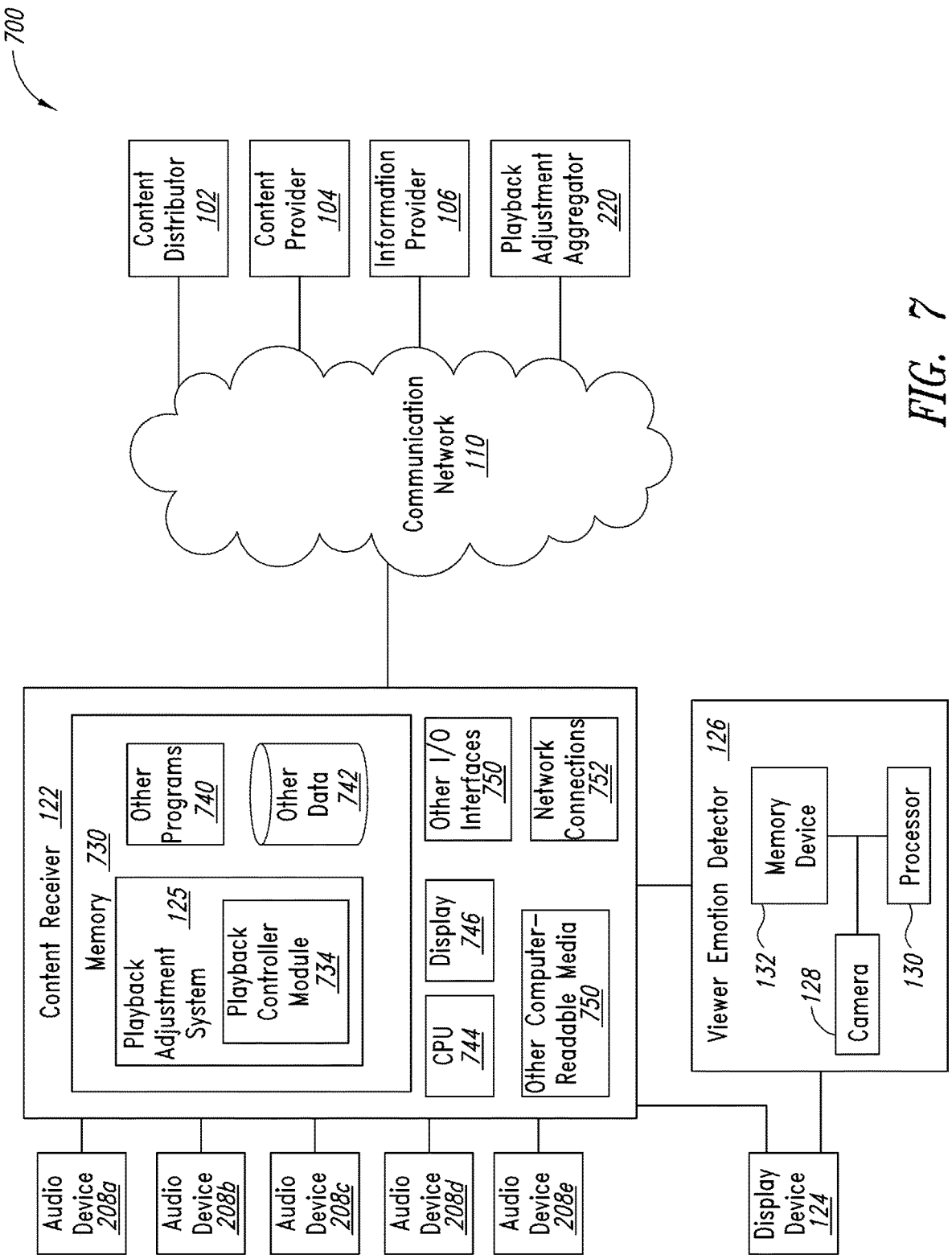
FIG. 7 shows a system diagram that describes one implementation of computing systems for implementing embodiments described herein.

FIG. 7 shows a system diagram that describes one implementation of computing systems for implementing embodiments described herein. System 700 includes content receiver 122, content distributor 102, content provider 104, and information provider 106.

Content receiver 122 receives content from content distributor 102 and analyzes the content to determine what playback attributes (e.g., playback speed, audio playback, and/or visual playback) should be adjusted and how they should be adjusted based on various emotions of the content viewer that have been detected and analyzed by the system. One or more special-purpose computing systems may be used to implement content receiver 122. Accordingly, various embodiments described herein may be implemented in software, hardware, firmware, or in some combination thereof. Content receiver 122 may include memory 730, one or more central processing units (CPUs) 744, display interface 746, other I/O interfaces 748, other computer-readable media 750, and network connections 752.

Memory 730 may include one or more various types of non-volatile and/or volatile storage technologies. Examples of memory 730 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 730 may be utilized to store information, including computer-readable instructions that are utilized by CPU 744 to perform actions, including embodiments described herein.

Memory 730 may have stored thereon playback adjustment system 125, which includes playback controller module 734. The playback controller module 734 may employ embodiments described herein to analyze viewer emotions to adjust playback speed, playback audio settings, and/or playback visual settings. The playback controller module 734 utilizes the adjusted playback attributes to provide playback to the display device 124 and the audio devices 208a-208e. Memory 730 may also store other programs 740 and other data 742. For example, other data 742 may include one or more default playback attributes for the viewers, viewer preferences, viewer profiles, or other data.

Display interface 746 is configured to provide content to a display device, such as display device 124 in FIG. 1. Network connections 752 are configured to communicate with other computing devices, such as content distributor 102, via communication network 110. Other I/O interfaces 748 may include a keyboard, audio interfaces, other video interfaces, or the like. Other computer-readable media 750 may include other types of stationary or removable computer-readable media, such as removable flash drives, external hard drives, or the like.

The content receiver 122 also communicates with the playback adjustment aggregator 220 via communication network 110 to provide playback attribute adjustments and receive playback attribute adjustments, as described herein. The playback adjustment aggregator 220 includes computing components similar to content receiver 122 (e.g., a memory, processor, I/O interfaces, and the like), but are not illustrated here for convenience. Additionally, the content distributor 102, content provider 104, information provider 106, and content receiver 122 may communicate via communication network 110.

In some embodiments, content distributor 102 includes one or more server computer devices to detect future programs and provide tags for the future programs to corresponding content receivers 122. These server computer devices include processors, memory, network connections, and other computing components that enable the server computer devices to perform actions as described herein.

In the dynamical playback adjustment system and method, various aspects of the systems, methods, functions, steps, features and the like corresponding thereto disclosed herein may be implemented on one or more computer systems using hardware, software, firmware, circuits, or combinations thereof. Hardware, software, firmware, and circuits respectively refer to any hardware, software, firmware, or circuit component. Computer systems referred to herein may refer to any computing device and vice versa (e.g., smart phone, mobile computing device, personal data assistant, tablet computer, laptop computer, desktop computer, other computing device, and the like).

In at least one embodiment of the dynamical playback adjustment system and method, any method, function, step, feature, or result may be considered a module that may include software instructions that cause, when executed by a computing device, the desired method, function, step, feature, or result. Executed by a computing device includes execution by any hardware component (e.g., CPU, GPU, network interface, integrated circuits, other hardware components, and the like) of the computing device such as a hardware processor. Any module may be executed by a computing device (e.g., by a processor of the computing device). Any method, function, step, feature, result, and the like disclosed herein may be implemented by one or more software modules whether explicitly described or not. Individual components within a computing device may work together to accomplish a desired method, function, step, feature, or result. For example, a computing device may receive data and process the data. A simple example would be that a network interface receives the data and transmits the data over a bus to a processor.

Various aspects of the dynamical playback adjustment system and method disclosed herein may be implemented as software executing in a computer system. The computer system may include a central processing unit (i.e., a hardware processor) connected to one or more memory devices, a graphical processing unit, input devices such as a mouse and keyboard, output devices such as speakers and a display, a network interface to connect to one or more other computer systems (e.g., one or more computer systems configured to provide a service such that function as a database), an operating system, a compiler, an interpreter (i.e., a virtual machine), and the like.

Throughout the specification, claims, and drawings of the dynamical playback adjustment system and method, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Some portions of the detailed description of the dynamical playback adjustment system and method are presented in terms of algorithms and symbolic representations of operations on data bits within a computer memory. These algorithmic descriptions and representations are the means used by those skilled in the data processing arts to most effectively convey the substance of their work to others skilled in the art. An algorithm, as described herein, is a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the dynamical playback adjustment system and method also relate to an apparatus for performing the operations herein. This apparatus may be specially constructed for the required purposes, and it may require selective activation or reconfiguration by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Moreover, in the dynamical playback adjustment system and method, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

These and other changes may be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the breadth and scope of a disclosed embodiment should not be limited by any of the above-described exemplary embodiments, but should be defined only in accordance with the following claims and their equivalents.

The invention claimed is:

1. A method of adjusting playback of content in response to a viewer's emotional reaction, comprising:
    presenting content to a viewer on a display screen from a content receiver, the content from the content receiver including subject matter and metadata associated with the subject matter, the metadata including information on genre of the content and dialog in the content, the content including audio content and visual content;
    detecting viewer emotion, via a camera, in reaction to the subject matter of the content currently being presented on the display screen;
    using facial recognition to identify viewer emotion without using an identity of a particular individual or profile;
    analyzing the viewer emotion, using a processor, in reaction to the subject matter of the content presented on the display screen;
    identifying the analyzed viewer emotion, using the processor, in reaction to the subject matter of the content presented on the display screen;
    associating an identified viewer emotion with at least one playback attribute linked with the presentation of the content using the metadata associated with the subject matter of the content presented on the display screen, the metadata including the information on the genre of the content and the dialog in the content;
    automatically adjusting the at least one playback attribute linked with the presentation of the content that is associated with the identified viewer emotion, based on the dynamic, real-time, emotional reaction of the viewer to the content being presented to the viewer, not the identity of the viewer, the at least one playback attribute including decreasing the playback speed of the content by different degrees of adjustments that include at least two decrease rates between an original playback rate and stop, wherein the playback speed of the content is decreased a first decrease rate in response to a first emotion, and wherein the playback speed of the content is decreased a second decrease rate in response to a second emotion; and outputting, via the display screen to the viewer, the content with the adjusted at least one playback attribute.

2. The method of claim 1, wherein adjusting the at least one playback attribute comprises: adjusting a playback speed attribute of the content, adjusting a visual playback attribute of the content, adjusting an audio playback attribute of the content, or combinations thereof.

3. The method of claim 2, wherein adjusting a playback speed attribute of the content comprises: increasing a playback speed of the content, decreasing the playback speed of the content, repeating a portion of the content, or combinations thereof.

4. The method of claim 2, wherein adjusting an audio playback attribute of the content comprises: increasing or decreasing an overall volume level, increasing or decreasing a dialog volume level, increasing or decreasing a surround sound volume level, changing a language setting, or combinations thereof.

5. The method of claim 2, wherein adjusting a visual playback attribute of the content comprises: increasing or decreasing a brightness level, increasing or decreasing a contrast level, changing a display setting for closed captions, changing a display setting for language subtitles, changing a display setting for a score during a sporting event, or combinations thereof.

6. The method of claim 1, wherein detecting viewer emotion comprises: detecting facial expressions of the viewer that are used by an emotion analysis system to analyze viewer emotions in reaction to presented content.

7. The method of claim 6, wherein analyzing of the viewer emotion in reaction to the subject matter of the content presented on the display screen comprises: comparing the detected facial expressions of the viewer with stored examples of facial expressions in the emotion analysis system to assist in identifying the viewer emotions.

8. The method of claim 6, further comprising: examining metadata corresponding to the subject matter of the content causing the viewer emotion and using the corresponding metadata to narrow options of possible emotions being identified by the emotion analysis system.

9. The method of claim 1, further comprising:
examining the metadata corresponding to the subject matter of the content causing the viewer emotion, and
determining an associated playback attribute adjustment from among more than one associated playback attribute adjustments using a combination of identified viewer emotion and the subject matter of the content causing the viewer emotion.

10. The method of claim 1, wherein the first emotion that creates the first decrease rate of the playback speed is joy, and wherein the second emotion that creates the second decrease speed rate of the playback speed is excitement.

11. A system that adjusts playback of content in response to a viewer's emotional reaction, comprising:
one or more cameras;
one or more processors; and
a memory device storing a set of instructions that, when executed by the one or more processors, causes the one or more processors to:
detect viewer emotion, via the one or more cameras, in reaction to subject matter of content being presented on a display screen, the content including subject matter and metadata associated with the subject matter, the metadata including information on genre of the content and dialog in the content, the content including audio content and visual content;
use facial recognition to identify viewer emotion without using an identity of a particular individual or profile;
analyze the viewer emotion in reaction to the subject matter of the content presented on the display screen;
identify the analyzed viewer emotion in reaction to the subject matter of the content presented on the display screen;
associate an identified viewer emotion with at least one playback attribute linked with the presentation of the content using the metadata associated with the subject matter of the content presented on the display screen, the metadata including the information on the genre of the content and the dialog in the content;
automatically adjust the at least one playback attribute linked with presentation of the content that is associated with the identified viewer emotion, based on the dynamic, real-time, emotional reaction of the viewer to the content being presented to the viewer, not the identity of the viewer, the at least one playback attribute including decreasing the playback speed of the content by different degrees of adjustments that include at least two decrease rates between an original playback rate and stop, wherein the playback speed of the content is decreased a first decrease rate in response to a first emotion, and wherein the playback speed of the content is decreased a second decrease rate in response to a second emotion; and
output, via the display screen to the viewer, the content with the adjusted at least one playback attribute.

12. The system of claim 11, wherein the at least one playback attribute is selected from a group of playback speed attribute adjustments of the content, visual playback attribute adjustments of the content, audio playback attribute adjustments of the content, or combinations thereof.

13. The system of claim 12, wherein the playback attribute adjustments comprise the playback speed attribute adjustments of the content, wherein the playback speed attribute adjustments of the content include: increasing playback speed of the content, decreasing the playback speed of the content, repeating a portion of the content, and combinations thereof.

14. The system of claim 12, wherein the playback attribute adjustments comprise the audio playback attribute adjustments of the content, wherein the audio playback attribute adjustments of the content include: increasing or decreasing an overall volume level, increasing or decreasing a dialog volume level, increasing or decreasing a surround sound volume level, changing a language setting, and combinations thereof.

15. The system of claim 12, wherein the playback attribute adjustments comprise the visual playback attribute adjustments of the content, wherein the visual playback attribute adjustments of the content include: increasing or decreasing a brightness level, increasing or decreasing a contrast level, display of closed captions, display of language subtitles, display of score during a sporting event, and combinations thereof.

16. The system of claim 11, wherein the detected viewer emotions each comprise detected facial expressions that are used by an emotion analysis system to assist in viewer emotion analysis in reaction to presented content.

17. The system of claim 16, wherein the emotion analysis system examines the metadata corresponding to the subject matter of the content causing the viewer emotion and uses the corresponding metadata to narrow an option of possible emotions being identified by the emotion analysis system.

18. The system of claim 11, wherein each identified viewer emotion has more than one associated playback attribute adjustments, wherein the emotion analysis system examines the metadata corresponding to the subject matter of the content causing the viewer emotion, and wherein a combination of the identified viewer emotion and the subject matter of the content causing the viewer emotion determine an associated playback attribute adjustment from among the more than one associated playback attribute adjustments.

19. The system of claim 11, wherein the first emotion that creates the first decrease rate of the playback speed is joy, and wherein the second emotion that creates the second decrease speed rate of the playback speed is excitement.

20. A method of adjusting playback of content in response to a viewer's emotional reaction, comprising:

detecting viewer emotion, via a camera, in reaction to subject matter of the content being presented on a display screen, the content including subject matter and metadata associated with the subject matter, the metadata including information on genre of the content and dialog in the content, the content including audio content and visual content;

using facial recognition to identify viewer emotion without using an identity of a particular individual or profile;

analyzing the viewer emotion in reaction to the subject matter of the content presented on the display screen;

identifying the analyzed viewer emotion in reaction to the subject matter of the content presented on the display screen;

associating an identified viewer emotion with at least one playback attribute linked with the presentation of the content using the metadata associated with the subject matter of the content presented on the display screen, the metadata including the information on the genre of the content and the dialog in the content;

automatically adjusting the at least one playback attribute linked with presentation of the content that is associated with the identified viewer emotion, based on the dynamic, real-time, emotional reaction of the viewer to the content being presented to the viewer, not the identity of the viewer, the at least one playback attribute including decreasing the playback speed of the content by different degrees of adjustments that include at least two decrease rates between an original playback rate and stop, wherein the playback speed of the content is decreased a first decrease rate in response to a first emotion, and wherein the playback speed of the content is decreased a second decrease rate in response to a second emotion; and outputting, via the display screen to the viewer, the content with the adjusted at least one playback attribute.

\* \* \* \* \*

UNITED STATES PATENT AND TRADEMARK OFFICE
CERTIFICATE OF CORRECTION

PATENT NO. : 11,601,715 B2  
APPLICATION NO. : 15/643347  
DATED : March 7, 2023  
INVENTOR(S) : Rima Shah et al.

Page 1 of 1

It is certified that error appears in the above-identified patent and that said Letters Patent is hereby corrected as shown below:

On the Title Page

Item (73) Assignee:  
"DISH Technologies L.L.C., Englewood, CA (US)"  
Should read:  
--DISH Technologies L.L.C., Englewood, CO (US)--.

Signed and Sealed this  
Eighth Day of April, 2025

Coke Morgan Stewart  
*Acting Director of the United States Patent and Trademark Office*